(12) United States Patent
Ratasuk et al.

(10) Patent No.: US 12,324,003 B2
(45) Date of Patent: Jun. 3, 2025

(54) COUNTING OF DEVICES (71) Applicant: Nokia Technologies Oy, Espoo (FI)

(72) Inventors: Rapeepat Ratasuk, Inverness, IL (US); Frank Frederiksen, Klarup (DK); Jing He, Beijing (CN); Zexian Li, Espoo (FI); David Bhatoolaul, Swindon (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 498 days.

(21) Appl. No.: 17/774,533

(22) PCT Filed: Nov. 7, 2019

(86) PCT No.: PCT/CN2019/116231
§ 371 (c)(1),
(2) Date: May 5, 2022

(87) PCT Pub. No.: WO2021/087855
PCT Pub. Date: May 14, 2021

(65) Prior Publication Data
US 2022/0408410 A1    Dec. 22, 2022

(51) Int. Cl.
*H04W 72/30*    (2023.01)
*H04W 72/044*   (2023.01)

(52) U.S. Cl.
CPC ......... *H04W 72/30* (2023.01); *H04W 72/046* (2013.01)

(58) Field of Classification Search
CPC ...... H04W 4/06; H04W 72/046; H04W 72/30
USPC ....... 370/329, 429, 390, 336, 312, 328, 252, 370/208, 331, 330, 216, 280, 503
See application file for complete search history.

(56) References Cited

U.S. PATENT DOCUMENTS

| 2008/0113636 | A1* | 5/2008 | Kikuchi | ............... | H04B 1/7117 375/E1.032 |
|---|---|---|---|---|---|
| 2010/0329167 | A1 | 12/2010 | Linden et al. | | |
| 2011/0019604 | A1 | 1/2011 | Chun et al. | | |
| 2011/0149783 | A1 | 6/2011 | Zhang | | |
| 2013/0070660 | A1 | 3/2013 | Xu | | |
| 2013/0107784 | A1 | 5/2013 | Chang | | |

(Continued)

FOREIGN PATENT DOCUMENTS

| CN | 101883327 A | 11/2010 |
|---|---|---|
| CN | 102440066 A | 5/2012 |

(Continued)

OTHER PUBLICATIONS

Office action received for corresponding Chinese Patent Application No. 201980103183.0, dated Jan. 20, 2024, 6 pages of office action and no page of translation available.

(Continued)

*Primary Examiner* — Joseph Arevalo
(74) *Attorney, Agent, or Firm* — Lippes Mathias LLP (57) ABSTRACT

Example embodiments of the present disclosure relate to devices, methods, apparatuses and computer readable storage media for counting of devices. In example embodiments, a first device receives, from a second device, a first configuration associated with an event to trigger transmission of a counting signal from the first device to the second device. When the event occurs, the first device transmits, to the second device, at least the counting signal to enable the second device to count the number of devices for determining a type of signals.

13 Claims, 5 Drawing Sheets

(56) References Cited

U.S. PATENT DOCUMENTS

| | | | |
|---|---|---|---|
| 2013/0294320 A1 | 11/2013 | Jactat et al. | |
| 2015/0068871 A1* | 3/2015 | Tachibana | B65G 43/10 |
| | | | 198/502.1 |
| 2015/0215988 A1* | 7/2015 | Uchino | H04W 76/25 |
| | | | 370/329 |
| 2018/0052685 A1* | 2/2018 | Ouyang | G06F 9/3877 |
| 2018/0176877 A1 | 6/2018 | Wang et al. | |
| 2018/0313373 A1* | 11/2018 | Pinet | F16K 37/0041 |
| 2018/0359614 A1 | 12/2018 | Yu et al. | |
| 2019/0053271 A1 | 2/2019 | Islam et al. | |
| 2019/0182699 A1 | 6/2019 | Shrivastava et al. | |
| 2020/0314031 A1* | 10/2020 | Kaku | H04L 49/3009 |
| 2020/0366475 A1* | 11/2020 | Nakamura | H04L 9/0838 |
| 2020/0396438 A1* | 12/2020 | Taki | G06F 3/013 |
| 2023/0217306 A1* | 7/2023 | Kim | H04W 76/19 |
| | | | 370/329 |
| 2023/0217506 A1* | 7/2023 | Löhr | H04W 74/006 |
| | | | 370/329 |
| 2024/0298304 A1* | 9/2024 | Chun | H04W 72/0453 |

FOREIGN PATENT DOCUMENTS

| | | |
|---|---|---|
| CN | 103202040 A | 7/2013 |
| CN | 104303545 A | 1/2015 |
| CN | 106559829 A | 4/2017 |
| CN | 108370557 A | 8/2018 |
| WO | 2014/053084 A1 | 4/2014 |
| WO | 2015/096718 A1 | 7/2015 |
| WO | 2016/119199 A1 | 8/2016 |

OTHER PUBLICATIONS

Office Action received for corresponding European Patent Application No. 19951874.7, dated Mar. 6, 2024, 5 pages.

Huang et al., "A Dynamic Hybrid Counting Procedure for EMBMS of 3GPP", IEEE Wireless Communications and Networking Conference (WCNC), Mar. 19-22, 2017, 6 pages.

International Search Report and Written Opinion received for corresponding Patent Cooperation Treaty Application No. PCT/CN2019/116231, dated Jul. 29, 2020, 10 pages.

"Key Issue: Mode switch and Session continuity", SA WG2 Meeting #135, S2-1909950, Agenda: 8.7, Huawei, Oct. 14-18, 2019, 1 pages.

Office action received for corresponding Chinese Patent Application No. 201980103183.0, dated May 12, 2023, 8 pages of office action and no page of translation available.

Extended European Search Report received for corresponding European Patent Application No. 19951874.7, dated Jun. 12, 2023, 7 pages.

Office Action received for corresponding Indian Patent Application No. 202247031863, dated Oct. 3, 2022, 8 pages.

* cited by examiner

COUNTING OF DEVICES

RELATED APPLICATION

This application was originally filed as PCT Application No. PCT/CN2019/116231, filed on Nov. 7, 2019, of which is incorporated herein by reference in its entirety.

FIELD

Example embodiments of the present disclosure generally relate to the field of communications, and in particular, to devices, methods, apparatuses and computer readable storage media for counting of devices.

BACKGROUND

Currently, broadcast or multicast services are not supported in New Radio (NR). In the third Generation Partnership Project (3GPP) Release 17 (Rel-17), broadcast or multicast transmission is identified as one candidate feature to be introduced for NR. For the broadcast or multicast transmission, local areas without a single-frequency network mode are considered to support single-cell or multi-cell multicast traffic transmission similar to a single-cell point-to-multipoint (SC-PTM) mode in Long Term Evolution (LTE).

The broadcast or multicast transmission needs to be supported in both of Frequency Range 1 (FR1) (410-7125 MHz), Frequency Range 2 (FR2) (24250-52600 MHz), and potentially beyond 52.6 GHz. In FR2 or beyond, a beam-based or multi-beam operation is a typical operation mode. In the beam-based or multi-beam operation, a NR NodeB (or gNB) needs to send a broadcast message (for example, a paging message) out on all beams to cover an entire cell since the gNB does not know which beam is to be used for user equipment (UEs). If less UEs are receiving the broadcast message on some beams or even all beams in a time period, the transmission of the broadcast message will waste a huge amount of system overhead.

SUMMARY

In general, example embodiments of the present disclosure provide devices, methods, apparatuses and computer readable storage media for counting of devices.

In a first aspect, a first device is provided which comprises at least one processor and at least one memory including computer program code. The at least one memory and the computer program code are configured to, with the at least one processor, cause the first device to receive, from a second device, a first configuration associated with an event to trigger transmission of a counting signal from the first device to the second device. The first device is further caused to transmit, to the second device when the event occurs, at least the counting signal to enable the second device to count the number of devices for determining a type of signals.

In a second aspect, a second device is provided which comprises at least one processor and at least one memory including computer program code. The at least one memory and the computer program code are configured to, with the at least one processor, cause the second device to allocate a first configuration associated with an event to trigger transmission of one or more counting signals from one or more further devices and send the first configuration. The second device is further caused to count, based on the number of counting signals, the number of devices to determine a type of signals.

In a third aspect, a method is provided. In the method, a first device receives, from a second device, a first configuration associated with an event to trigger transmission of a counting signal from the first device to the second device. When the event occurs, the first device transmits, to the second device, at least the counting signal to enable the second device to count the number of devices for determining a type of signals.

In a fourth aspect, a method is provided. In the method, a second device determines a first configuration associated with an event to trigger transmission of one or more counting signals from one or more further devices. The second device sends the first configuration. The second device then counts, based on the number of counting signals, the number of devices to determine a type of signals.

In a fifth aspect, there is provided an apparatus comprising means for performing the method according to the third or fourth aspect.

In a sixth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure. The UE may also correspond to Mobile Termination (MT) part of the integrated access and backhaul (IAB) node (a.k.a. a relay node).

As used herein, the term "network device" refers to a device via which services can be provided to a terminal device in a communication network. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like. A relay node may correspond to Distributed Unit (DU) part of the IAB node.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

In 3GPP Rel-17, broadcast or multicast transmission is identified as one candidate feature to be introduced for NR. For multicast transmission to UEs or devices in a "non-RRC connected" mode, the gNB doesn't know how many UEs are receiving the service. If the number of UEs receiving the same service is smaller, it may be more efficient to use unicast transmission rather than multicast or broadcast transmission. Similarly, if the number of UEs receiving the same service is larger, broadcast transmission may be more efficient than unicast or even multicast transmission.

Furthermore, if the gNB uses multicast transmission in a beam-based or multi-beam operation in FR2, the gNB needs to cover the entire cell since the gNB does not know which beam or beams to use for the UEs. Therefore, the gNB will perform Single-Cell Multicast Traffic Channel (SC-MTCH) transmission on a Physical Downlink Shared Channel (PDSCH) on all beams. Each PDSCH is individually scheduled by corresponding downlink control information (DCI) on a Physical Downlink Control Channel (PDCCH).

Figure 1:
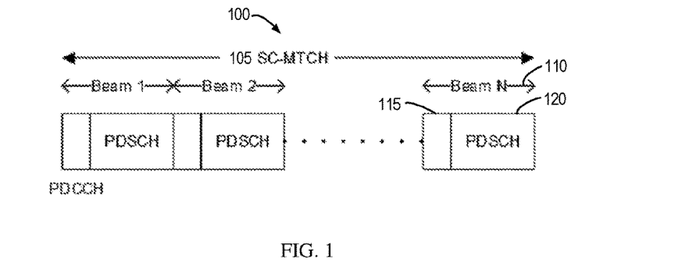
FIG. 1 illustrates an example process of beam-based multicast transmission.

FIG. 1 shows an example process 100 of beam-based multicast transmission of a gNB. In a process 100 as shown in FIG. 1, the multicast transmission is SC-MTCH transmission 105. For the SC-MTCH transmission 105, the gNB uses a plurality of beams 110-1, 110-2, . . . , 110-N (labeled as Beam 1, Beam 2, . . . , Beam N) successively for transmission on a PDCCH 115 and a PDSCH 120. Herein, N represents any suitable positive integer.

For instance, if there are 32 beams in the cell, where up to 64 beams can be supported in NR, then the gNB transmits the PDSCH 32 times to ensure cell-wide coverage. If the gNB knows that UEs receiving a given multicast/broadcast service are only on 4 beams and that those UEs are stationary, then the gNB can perform the transmission on only those 4 beams. The multicast or broadcast transmission on all beams will waste a significant amount of system resource.

In LTE Enhanced Multimedia Broadcast Multicast Service (eMBMS), there is a counting procedure to determine the number of UEs receiving the service. The counting procedure can be initiated by an MBMSCountingRequest message from evolved NodeB (eNB) to a UE. However, this procedure requires the UEs to be in a Radio Resource Control (RRC) CONNECTED mode. UEs that are in an IDLE or RRC_INACTIVE mode would have to be moved into a CONNECTED mode for this procedure. Accordingly, for each UE, the RRC connection has to be established through a Random Access Channel (RACH) procedure and be terminated again after the counting procedure is done. Therefore, the overhead associated with this procedure is still very high.

Example embodiments of the present disclosure provide an efficient counting scheme upon triggering of an event. The event to trigger a counting procedure may comprise detection of a triggering signal, expiration of a timer or any other suitable events. For example, if a triggering signal is used, a device such as a terminal device may detect a triggering signal from a further device such as a network device or a further terminal device. If a timer is configured, the device may determine whether the timer is expired. The event and associated configuration are configured or determined by the further device.

If such an event occurs, the device transmits, to the further device, a signal designed for the counting procedure. This signal will be referred to as a counting signal. Further, the further device can determine the number of devices capable of receiving a type of signals. The type of signals may be associated with a service or feature that can be enabled in a network.

The counting scheme according to example embodiments of the present disclosure may be applicable to terminal devices in any mode, such as UEs in IDLE, INACTIVE and potentially CONNECTED modes. Thus, the network device such as a gNB may effectively and efficiently determine whether a specific service or feature would be turned on or not. This can save a significant amount of system overhead.

Figure 2:
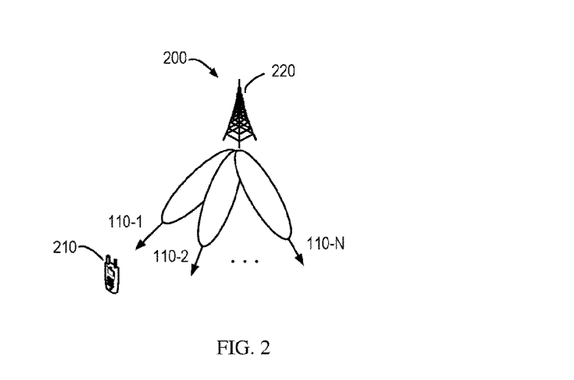
FIG. 2 illustrates an example environment in which example embodiments of the present disclosure can be implemented.

FIG. 2 shows an example environment 200 in which example embodiments of the present disclosure can be implemented.

The environment 200, which may be a part of a communication network, comprises two devices 210 and 220 communicating with each other, which are referred to as a first device 210 and a second device 220, respectively. In this example, the first device 210 is implemented by a terminal device such as a UE, and the second device 220 is implemented by a network device such as a base station. The first and second devices 210 and 220 may be implemented by any other suitable devices. For example, the first and second devices 210 and 220 may be both implemented by terminal devices. It is to be understood that there may be any other suitable devices. For example, there may be more terminal devices that are served by the network device, or a plurality of network devices, each serving a plurality of terminal devices. There may be other network devices than a base station, such as a server.

The communication between the first and second devices 210 and 220 may follow any suitable communication standards or protocols, which are already in existence or to be developed in the future, such as Universal Mobile Telecommunications System (UMTS), Long Term Evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, machine type communication (MTC), enhanced Machine Type Communication (eMTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

As shown, the second device 220 may apply the beam-based operation and use a plurality of beams 110-1, 110-2, ..., 110-N for transmission. The first device 210 may receive signals from the second device 220 on the beam 110-1. The beam based operation is only an example but not a limitation. In some other example embodiments, the second device 220 may transmit an omnidirectional signal to all devices with its coverage.

In various example embodiments, the second device 220 can perform a counting procedure upon the triggering of an event.

Figure 3:
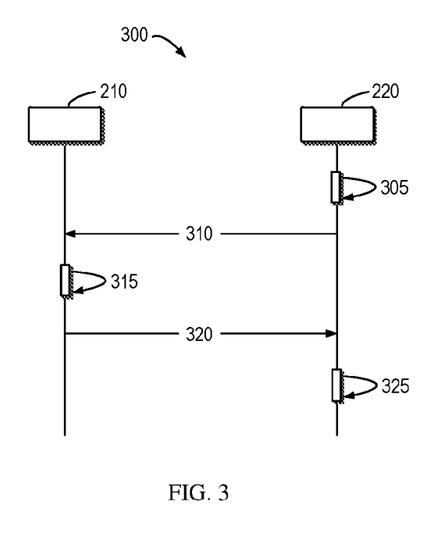
FIG. 3 illustrates a high-level interaction process between the first and second devices according to some example embodiments of the present disclosure.

FIG. 3 shows a high-level interaction process 300 between the first device 210 and the second device 220 according to some example embodiments of the present disclosure.

In the process 300, the second device 220 determines (305) a configuration (referred to as a first configuration) associated with the event. The second device 220 sends (310) the first configuration to the first device 210. The first device 210 determines (315) whether the event occurs. If the event occurs, the first device 210 transmits (320) a counting signal to the second device 220. Based on the counting signal from the first device 210 and other counting signals from other devices (not shown), the second device 220 determines (325) the number of devices for providing a unicast, a multicast or a broadcast service. Further, the second device 220 can determine whether to turn on or enable a service or feature associated with a type of signals (e.g., a unicast signal, a multicast signal or a broadcast signal).

Figure 4:
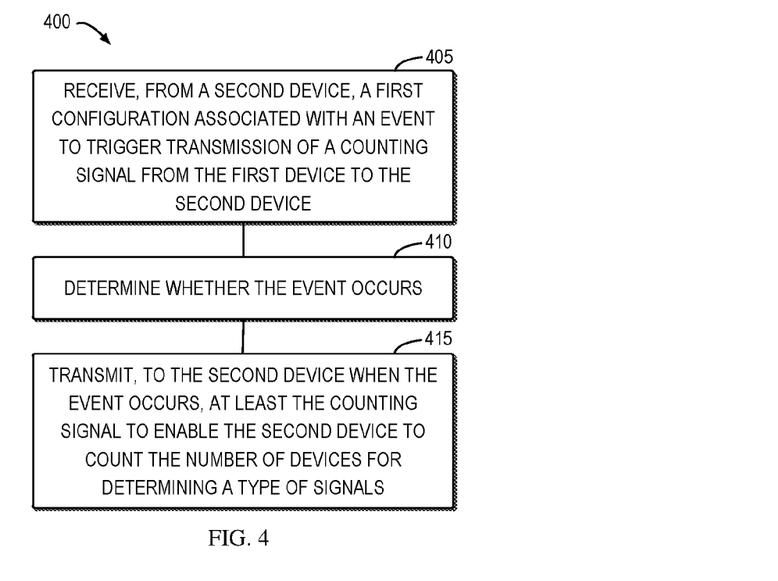
FIG. 4 illustrates a flowchart of an example method according to some example embodiments of the present disclosure.

FIG. 4 shows a flowchart of an example method 400 according to some example embodiments of the present disclosure. The method 400 can be implemented by the first device 210 as shown in FIG. 2. For the purpose of discussion, the method 400 will be described with reference to FIG. 2.

At block 405, the first device 210 receives, from the second device 220, the first configuration associated with an event to trigger transmission of a counting signal from the first device 210. The event may comprise any suitable event, and the first configuration may comprise any suitable configuration associated with the event. The first configuration may be transmitted from the second device 220 to the first device 210 via higher-layer signaling such as Radio Resource Control (RRC) signaling and system information block (SIB) such as SIB1 or lower-layer (for example, physical layer) signaling such as downlink control information (DCI).

In some example embodiments, the event may comprise detection of a triggering signal from the second device 220. The triggering signal may be a predefined sequence which is known to both the first and second devices 210 and 220. In some example embodiments, the triggering signal may be associated with a use case of the counting scheme. For example, in the case that the counting scheme is applied in a unicast, a multicast or a broadcast service, the triggering signal may be associated with a radio network temporary identifier (RNTI) that identifies the multicast or broadcast service. As an example, the triggering signal may be a group triggering signal associated to a Group RNTI (G-RNTI) that is tied to a specific multicast service. In the case that other services or features are involved, a service or feature specific mapping may be configured for the triggering signal. For example, the triggering signal may be associated with a capability bit or feature group.

The triggering signal may be sent by the second device 220 and thus detected by the first device 210 in a predefined time interval. In some example embodiments, the time interval may be orthogonal to or separated from a Discontinuous Reception (DRX) procedure for paging, for example. In this way, in the example embodiments where the first device 210 is implemented by a terminal device and the second device 220 is implemented by a network device, it may be ensured that all terminal devices in any connection mode within a cell would monitor for the triggering signal, thereby improving the efficiency of the counting procedure.

In some example embodiments, the first configuration may comprise starting time (for example, a starting subframe or slot), duration and/or periodicity of the time interval. Accordingly, the first device 210 can detect the triggering signal based on the configured starting time, duration and/or periodicity such that the transmission efficiency may be improved. In the case that the periodicity of the time interval is configured, the first device 210 may remain in a low-power state and wake-up periodically to monitor the triggering signal. As such, the power consumption of the first device 210 may be reduced.

In addition to the triggering signal, a timer may be used to trigger the transmission of the counting signal. Accordingly, expiration of the timer may act as the event to trigger. The first configuration associated with the event may indicate duration or periodicity of the timer.

The counting signal may be a signal designed for the counting procedure, which may be implemented in any suitable form. The counting signal may be predefined in the network or determined by the first device 210. In some example embodiments, the first device 210 may receive a configuration (referred to as a second configuration) associated with the counting signal. The second configuration may be transmitted from the second device 220 and received by the first device 210 via higher-layer signaling such as Radio Resource Control (RRC) signaling and system information block (SIB) such as SIB1 or lower-layer (for example, physical layer) signaling such as downlink control information (DCI). The second configuration may comprise any suitable configuration associated with the counting signal to allow the first device 210 to determine a counting signal to be used and/or a time and frequency resource for transmission of the counting signal. In some example embodiments, the second configuration for the counting signal may be received together with the first configuration for the triggering signal, for example, in the same RRC signaling or in the same SIB or even in the same information element.

In some example embodiments, a random access preamble or preamble sequence acts as the counting signal. For example, the second device 220 may configure one or more random access preambles or preamble sequences (which may be also referred to a preamble group) for selection by the first device 210. In this example, the second configuration may indicate the one or more preambles and a time and frequency resource of a RACH or a configured grant (CG) for the transmission of the preambles. Accordingly, the counting procedure may be implemented by utilizing a random access procedure. Thus, the terminal devices in an idle or inactive state can be counted in a more efficient way.

In some example embodiments, one or more reference counting signals may be configured by the second device 220 and indicated by the second configuration. In these example embodiments, the first device 210 may determine the counting signal from the one or more reference counting signals. In some example embodiments, the one or more reference counting signals may comprise a common counting signal (for example, a common preamble) that is reserved for a set of devices, for example, including the first device 210. Accordingly, the first device 210 may use the same common counting signal as one or more other devices. In some example embodiments, the first device 210 may add a timing and/or phase offset to the common counting signal to potentially avoid destructive waveform interferences at the second device 220, caused by the set of devices all using the common counting signal. The timing and/or phase offset may be randomly selected or implicitly determined (e.g. based on a device identifier) by the first device 210.

In some example embodiments, the one or more reference counting signals may comprise a set of candidate counting signals. In this case, from the set of candidate counting signals, the first device 210 selects a candidate counting signal as the counting signal. The selection may be performed according to a predefined rule. For example, in the example embodiments where the first device 210 is implemented by a UE and a set of preambles are configured as the candidate counting signals, the first device 210 may use the following equation (1) to select a preamble to be used:

$$\text{preamble index} = \text{UE\_ID} \bmod N \quad (1)$$

where a preamble index represents an index of a preamble, UE_ID represents a UE identification, and N represents the number of preambles in the set of preambles. It is also possible that the first device 210 selects a preamble randomly among the set.

At block 410, the first device 210 determines whether the event occurs. For example, in the example embodiments where the triggering signal and the time interval for detecting the triggering signal is configured, the first device 210 may determine whether the triggering signal is detected in the time interval. If the triggering signal is detected, the first device 210 may determine that the event occurs. In the example embodiments where the timer is configured, the first device 210 may determine whether the timer is expired. Upon the expiration of the timer, the first device 210 determines that the event occurs.

At block 415, when the event occurs, the first device 210 transmits at least the counting signal to the second device 220 to enable the second device 220 to count the number of devices for determining a type of signals. The transmission of the counting signal may be implemented by the first device 210 according to the second configuration received from the second device 220.

The type of signal may be associated with a use case of the counting scheme. For example, in the case that the counting scheme is applied to enable or disable a service or feature provided in the network, the type of signal may be related to the service or feature. Accordingly, the second device 220 may determine whether such a service or feature should be turned on or enabled in the network.

The counting scheme may be applied to any suitable case. For example, in the example embodiments where the first device 210 is implemented by a terminal device and the second device 220 is implemented by a network device, the second device 220 may use the counting scheme to determine the number of terminal devices camped in the coverage (for example, a cell) of the second device 220. In this case, the type of signals to be received by the terminal devices may comprise a multicast or broadcast signal such as a paging message or system information. In the example embodiments where the first device 210 is a terminal device in an idle or inactive mode, the type of signal may be a wake-up signal for paging.

In some example embodiments, the counting scheme may be applied in an idle-mode positioning service with information from only a single cell, for example, using an angle of arrival plus timing. In this case, the type of signals may comprise relevant positioning reference signals. Accordingly, the second device 220 can determine whether to transmit the relevant positioning reference signals.

In some example embodiments, the counting scheme may be applied in a unicast, a multicast or a broadcast service that is to be provided. In this case, the type of signals may be related to the unicast, multicast or broadcast service. The counting scheme may also be applied in an ongoing unicast, multicast or broadcast service. The interaction of the second device 220 and the first device 210 may be implemented using scheduling gaps during the ongoing multicast service. The second device 220 may determine whether the multicast service is to be stopped based on the determined number of devices for receiving the type of signals related to the ongoing multicast service. It is also possible that the counting scheme is applied in side-link multicast. In this case, both the first and the second device 210 and 220 can be terminal devices.

In some example embodiments, the beam-based operation may be implemented. In these example embodiments, the first device 210 may transmit, to the second device 220, the counting signal along with an indication of a preferred beam. In some example embodiments, the association between the counting signal and a beam or a synchronization signal block (SSB) may be predefined. For example, different configurations of the counting signal may be associated with different beams. In this case, the preferred beam may be explicitly or implicitly indicated by the counting signal. In this way, the second device 220 may count the devices per beam to further save the system overhead and improve the transmission efficiency. More example embodiments related to the beam based operation will be discussed from the prospect of the second device 220 with reference to FIG. 5.

Figure 5:
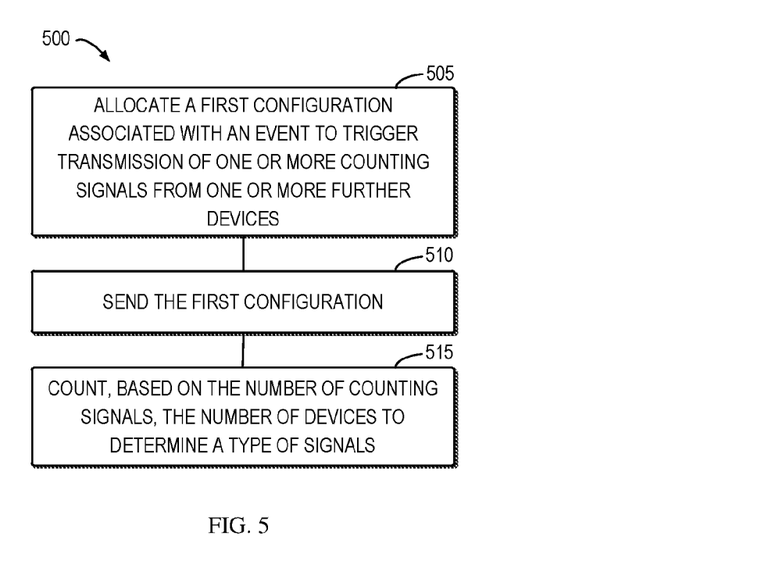
FIG. 5 illustrates a flowchart of an example method according to some other example embodiments of the present disclosure.

FIG. 5 shows a flowchart of an example method 500 according to some example embodiments of the present disclosure. The method 500 can be implemented by the second device 220 as shown in FIG. 2. For the purpose of discussion, the method 500 will be described with reference to FIG. 2.

At block 505, the second device 220 allocates the first configuration associated with an event to trigger the transmission of one or more counting signals from one or more further devices. The event may comprise detection of a triggering signal from the second device 220, the expiration of a timer, and/or any other suitable events to trigger the counting procedure.

In the example embodiments where the beam-based operation is implemented, the second device 220 may configure the triggering signal on all the beams to estimate the number of devices so as to determine whether to enable or disable a specific service or feature. In the example embodiments where the timer is used, the second device 220 may configure a timer to devices on one or more beams where a specific service has been started. Accordingly, the devices on the beams will start the timer and restarts the timer when it is expired.

At block 510, the second device 220 sends the first configuration. For example, the second device 220 may multicast or broadcast or even unicast the first configuration so that more devices, in an idle, inactive or connected mode, can receive the first configuration. In the example embodiments where the timer is configured on one or more beams, the second device 220 may send the first configuration for the timer on the beams.

In addition to the first configuration associated with the event to trigger, the second device 220 may also determine and send the second configuration associated with the counting signals. In the example embodiments where the second device 220 is implemented by a network device, the first configuration and the second configuration may be sent via higher-layer signaling such as RRC signaling and SIB such as SIB1 or via lower-layer (for example, physical layer) signaling such as DCI. In some example embodiments, the second configuration for the counting signal may be sent by the second device 220 together with the first configuration for the triggering signal, for example, in the same RRC signaling or SIB or even the same information element.

In the example embodiments where the beam based operation is implemented, different configurations for the counting signals may be determined for different beams. For example, the second configuration may be associated with one or more beams. Accordingly, the second device 220 will receive the counting signals on these beams. In some example embodiments, the counting signals may be associated with one or more beams. With the association of the counting signals and beams, the devices that will receive the type of signals may indicate preferred beams. For example, when the second device 220 receives the counting signals, the second device 220 can determine the corresponding beams which are preferred by the receiving devices.

In some example embodiments, the second configuration for the counting signals may be associated with a mobile or stationary state of the further devices including the first device 210. For example, the second device 220 may reserve one configuration of the counting signals for mobile devices and another configuration of the counting signals for stationary devices. For the stationary devices, it would be more beneficial for the second device 220 to determine which beams to transmit the service since their locations are relatively fixed.

In some example embodiments, the counting signals may comprise one or more random access preambles. In order to allow efficient processing, the second device 220 may generate a plurality of preambles from a root sequence.

At block 515, the second device 220 counts the number of devices based on the number of counting signals and determines a type of signals based on the number of counting signals. In some example embodiments, the number of devices is estimated based on the received signal strength. For example, in the example embodiments where a common counting signal is configured to a plurality of first devices, each of the plurality of first devices may transmit the common counting signal. In this example, the second device 220 may detect the common counting signals and determine the number of first devices based on the received signal strength of the detected common counting signals from the first devices 210.

In the example embodiments where one or more explicit indications or implicit indications (for example, in the case that the beams are implicitly indicated by the associated counting signals) are received by the second device 220, the second device 220 may determine which beams will be used to transmit the type of signals.

The type of signals may comprise a signal related to a service or feature. For example, in the example embodiments where the type of signals is a unicast, broadcast or multicast signal, the second device 220 may determine whether the broadcast or multicast signal or one or more unicast signals are to be transmitted to the first device 210 and other devices (not shown).

All operations and features in the method 400 at the first device 210 as described above with reference to FIGS. 2 and 3 are likewise applicable to the method 500 at the second device 220 and have similar effects. For the purpose of simplification, the details will be omitted.

Figure 6:
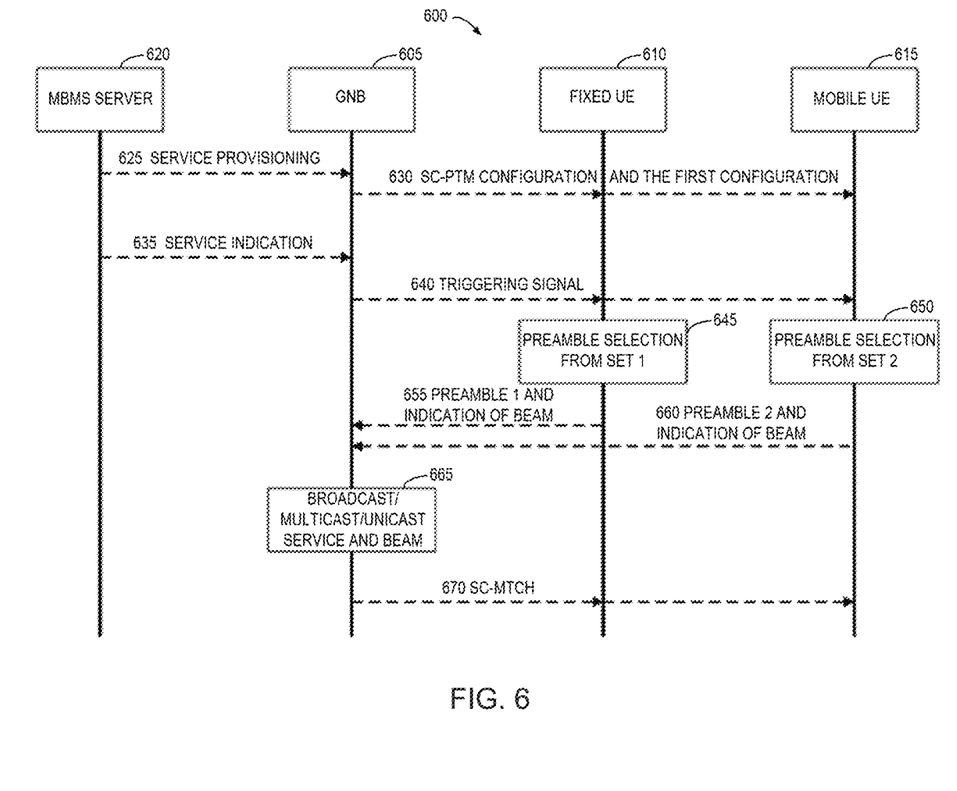
FIG. 6 illustrate an example counting procedure according to some example embodiments of the present disclosure.

FIG. 6 shows a counting procedure 600 according to some example embodiments of the present disclosure.

The counting procedure 600 may be performed based on the methods 400 and 500, so the overlapped details can be referred to FIGS. 2 to 5. In this example, the second device 220 is implemented by a gNB 605, and the first device 210 is implemented by a fixed UE 610, a stationary UE 610 or a mobile UE 615. The procedure 600 also involves a Multimedia Broadcast Multicast Service (MBMS) server 620. The type of signals is related to a unicast service, a multicast service and/or a broadcast service provided by the MBMS server 620 or the gNB 605. Even though, the number of the fixed UE or the mobile UE is one, the plural fixed UEs and the plural mobile UEs can be implemented.

As shown, the gNB 605 receives (625) service provisioning from the MBMS server 620. The gNB 605 sends (630) a single-cell point-to-multipoint (SC-PTM) configuration as well as the first configuration associated with the event to one or more fixed UEs 610 and one or more mobile UEs 615. In this example, the event to trigger is the detection of a triggering signal. Accordingly, the first configuration may indicate starting time (for example, a starting subframe), duration and/or periodicity of the triggering signal.

After the gNB 605 receives (635) a service indication from the MBMS server 620, the gNB 605 sends (640) a triggering signal to the one or more UEs 610 and 615 according to the first configuration. In this example, the fixed UEs and/or the mobile UEs may be configured with different sets of preambles and the same time and/or frequency configuration (for example, PRACH configuration). Alternately, fixed UEs may be allocated with one time and/or frequency configuration (e.g. first PRACH configuration) while mobile UEs may be allocated with another time and/or frequency configuration (e.g. second PRACH configuration). For example, the fixed UE 610 performs (645) the preamble selection from one set of preambles (represented by set 1), and the mobile UE 615 performs (650) the preamble selection from a different set of preambles (represented by as set 2). In addition to the preambles, the UEs 610 and 615 also determine (e.g., select) the preferred beams based on the triggering signal. Then, the fixed UE 610 sends (655) the preferred preamble (represented by preamble 1) and an indication of the preferred beam to the gNB 605. The mobile UE 615 also sends (660) the preferred preamble (represented by preamble 2) and an indication of the preferred beam to the gNB 605.

The gNB 605 determines (665) a broadcast, multicast, or unicast service and a beam to be used based on the indications received from the fixed UE 610 and the mobile UE 615. For example, in order to determine the type of service or feature, the gNB 605 counts the number of the indications received from the one or more fixed UEs 610 and/or the one or more mobile UEs 615. In this example, if the multicast transmission is determined (665) by the gNB 605, the gNB 605 performs (670) SC-MTCH transmission to the fixed UEs 610 and the mobile UEs 615.

Figure 7:
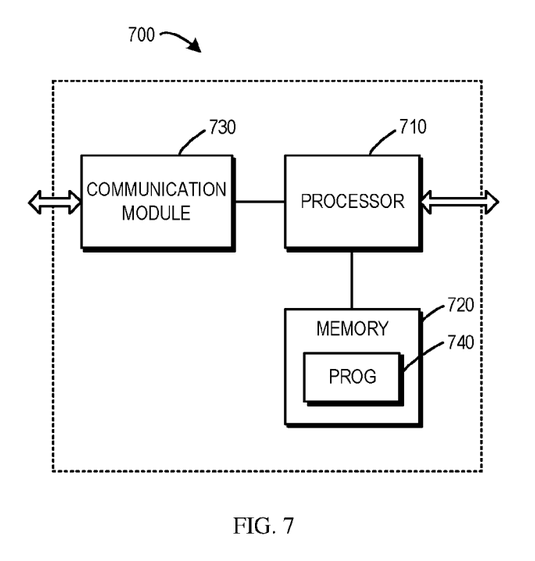
FIG. 7 illustrates a simplified block diagram of a device that is suitable for implementing example embodiments of the present disclosure.

FIG. 7 is a simplified block diagram of a device 700 that is suitable for implementing example embodiments of the present disclosure. The device 700 can be implemented at or as a part of the first device 210 or the second device 220 as shown in FIG. 2.

As shown, the device 700 includes a processor 710, a memory 720 coupled to the processor 710, a communication module 730 coupled to the processor 710, and a communication interface (not shown) coupled to the communication module 730. The memory 720 stores at least a program 740. The communication module 730 is for bidirectional communications, for example, via multiple antennas. The communication interface may represent any interface that is necessary for communication.

The program 740 is assumed to include program instructions that, when executed by the associated processor 710, enable the device 700 to operate in accordance with the example embodiments of the present disclosure, as discussed herein with reference to FIGS. 2-6. The example embodiments herein may be implemented by computer software executable by the processor 710 of the device 700, or by hardware, or by a combination of software and hardware. The processor 710 may be configured to implement various example embodiments of the present disclosure.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

When the device 700 acts as the first device 210 or a part of the first device 210, the processor 710 and the communication module 730 may cooperate to implement the method 400 as described above with reference to FIGS. 2 and 4. When the device 600 acts as the second device 220 or a part of the second device 220, the processor 610 and the communication module 630 may cooperate to implement the method 500 as described above with reference to FIGS. 2 and 5. All operations and features as described above with reference to FIGS. 2-6 are likewise applicable to the device 700 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 500 as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a first device comprises: at least one processor; and at least one memory including computer program code; the at least one memory and the computer program code configured to, with the at least one processor, cause the first device to: receive, from a second device, a first configuration associated with an event to trigger transmission of a counting signal from the first device to the second device; and transmit, to the second device when the event occurs, at least the counting signal to enable the second device to count the number of devices for determining a type of signals.

In some example embodiments, the event comprises detection of a triggering signal, and the first configuration indicates at least one of starting time, duration or periodicity of a time interval for detecting the triggering signal.

In some example embodiments, the type of signal is related to a unicast, multicast or broadcast service, and the triggering signal is associated with a radio network temporary identifier for identifying the unicast, multicast or broadcast service.

In some example embodiments, the event comprises expiration of a timer associated with one or more beams, and the first device is caused to receive the first configuration on one of the one or more beams.

In some example embodiments, the first device is further caused to: receive, from the second device, a second configuration associated with the counting signal.

In some example embodiments, the second configuration indicates at least one of one or more random access preambles or a time and frequency resource of a random access channel for transmission of the one or more random access preamble, and the counting signal comprises a random access preamble of the one or more random access preambles.

In some example embodiments, the second configuration indicates a common counting signal, and the first device is caused to generate the counting signal by adding at least one of a timing offset or a phase offset to the common counting signal.

In some example embodiments, the second configuration indicates a set of candidate counting signals, and the first device is caused to select, from the set of candidate counting signals, a candidate counting signal as the counting signal to be transmitted to the second device.

In some example embodiments, the second configuration is associated with one or more beams for the transmission of the counting signal.

In some example embodiments, the first device is caused to transmit, to the second device, an indication of a beam for the type of signals when the first device transmits the counting signal.

In some example embodiments, the at least counting signal indicates a beam for the type of signals.

In some example embodiments, the first device is in an idle mode or an inactive mode.

In some aspects, a second device comprises: at least one processor; and at least one memory including computer program code; the at least one memory and the computer program code configured to, with the at least one processor, cause the second device to: allocate a first configuration associated with an event to trigger transmission of one or more counting signals from one or more further devices; send the first configuration; and count, based on the number of counting signals, the number of devices to determine a type of signals.

In some example embodiments, the event comprises detection of a triggering signal from the second device.

In some example embodiments, the second device is further caused to: send the triggering signal on a plurality of beams.

In some example embodiments, the first configuration indicates at least one of starting time, duration or periodicity of a time interval for detecting the triggering signal.

In some example embodiments, the type of signal is related to a unicast, multicast or broadcast service, and the triggering signal is associated with a radio network temporary identifier for identifying the unicast, multicast or broadcast service.

In some example embodiments, the event comprises expiration of a timer associated with one or more beams, and the second device is caused to send the first configuration on the one or more beams.

In some example embodiments, the second device is further caused to: allocate a second configuration associated with the one or more counting signals; and send the second configuration.

In some example embodiments, the one or more counting signals comprises one or more random access preambles, and the second configuration indicates at least one of the one or more random access preambles or a time and frequency resource of a random access channel for the transmission of the one or more random access preambles.

In some example embodiments, the second device is further caused to: generate the one or more random access preambles from a root sequence.

In some example embodiments, the second configuration is associated with one or more beams for transmission of the one or more counting signals.

In some example embodiments, the second configuration indicates a set of candidate counting signals.

In some example embodiments, the second configuration indicates a common counting signal, and the second device is caused to detect the common counting signals; and count the number of devices based on the received signal strength of the detected common counting signals.

In some example embodiments, the second configuration is associated with a mobile or stationary state of the one or more further devices.

In some example embodiments, the second device is further caused to: detect one or more indication of one or more beams for the type of signals.

In some example embodiments, the one or more counting signals indicate one or more beams for the type of signals.

In some example embodiments, the second device is further caused to: select, based on the determined number of devices, the type of signals from a unicast signal, a multicast signal and a broadcast signal.

In some example embodiments, the second device is caused to broadcast or multicast the first configuration.

In some example embodiments, the one or more further devices are in an idle mode or an inactive mode.

In some aspects, a method implemented at a first device comprises: receiving, from a second device, a first configuration associated with an event to trigger transmission of a counting signal from the first device to the second device; and transmitting, to the second device when the event occurs, at least the counting signal to enable the second device to count the number of devices for determining a type of signals.

In some example embodiments, the event comprises detection of a triggering signal, and the first configuration indicates at least one of starting time, duration or periodicity of a time interval for detecting the triggering signal.

In some example embodiments, the type of signal is related to a unicast, multicast or broadcast service, and the triggering signal is associated with a radio network temporary identifier for identifying the unicast, multicast or broadcast service.

In some example embodiments, the event comprises expiration of a timer associated with one or more beams, and receiving the first configuration comprises: receiving the first configuration on one of the one or more beams.

In some example embodiments, the method further comprises: receiving, from the second device, a second configuration associated with the counting signal.

In some example embodiments, the second configuration indicates at least one of one or more random access preambles or a time and frequency resource of a random access channel for transmission of the one or more random access preamble, and the counting signal comprises a random access preamble of the one or more random access preambles.

In some example embodiments, the second configuration indicates a common counting signal, and the method further comprises: generating the counting signal by adding at least one of a timing offset or a phase offset to the common counting signal.

In some example embodiments, the second configuration indicates a set of candidate counting signals, and the method further comprises: selecting, from the set of candidate counting signals, a candidate counting signal as the counting signal to be transmitted to the second device.

In some example embodiments, the second configuration is associated with one or more beams for the transmission of the counting signal.

In some example embodiments, the at least counting signal indicates a beam for the type of signals.

In some example embodiments, the first device is in an idle mode or an inactive mode.

In some aspects, a method implemented at a second device comprises: allocating a first configuration associated with an event to trigger transmission of one or more counting signals from one or more further devices; sending the first configuration; and counting, based on the number of counting signals, the number of devices to determine a type of signals.

In some example embodiments, the event comprises detection of a triggering signal from the second device.

In some example embodiments, the method further comprises: sending the triggering signal on a plurality of beams.

In some example embodiments, the first configuration indicates at least one of starting time, duration or periodicity of a time interval for detecting the triggering signal.

In some example embodiments, the type of signal is related to a unicast, multicast or broadcast service, and the triggering signal is associated with a radio network temporary identifier for identifying the unicast, multicast or broadcast service.

In some example embodiments, the event comprises expiration of a timer associated with one or more beam, and sending the first configuration comprises: sending the first configuration on the one or more beams.

In some example embodiments, the method further comprises: allocating a second configuration associated with the one or more counting signals; and sending the second configuration.

In some example embodiments, the one or more counting signals comprises one or more random access preambles, and the second configuration indicates at least one of the one or more random access preambles or a time and frequency resource of a random access channel for the transmission of the one or more random access preambles.

In some example embodiments, the method further comprises: generating the one or more random access preambles from a root sequence.

In some example embodiments, the second configuration is associated with one or more beams for transmission of the one or more counting signals.

In some example embodiments, the second configuration indicates a set of candidate counting signals.

In some example embodiments, the second configuration indicates a common counting signal, and counting the number of devices comprises: detecting the common counting signals; and counting the number of devices based on the received signal strength of the detected common counting signals.

In some example embodiments, the second configuration is associated with a mobile or stationary state of the one or more further devices.

In some example embodiments, the method further comprises: detecting one or more indication of one or more beams for the type of signals.

In some example embodiments, the one or more counting signals indicate one or more beams for the type of signals.

In some example embodiments, the method further comprises: selecting, based on the determined number of devices, the type of signals from a unicast signal, a multicast signal and a broadcast signal.

In some example embodiments, sending the first configuration comprises:
broadcasting or multicasting the first configuration.

In some example embodiments, the one or more further devices are in an idle mode or an inactive mode.

In some aspects, an apparatus comprises: means for receiving, from a second device, a first configuration associated with an event to trigger transmission of a counting signal from the first device to the second device; and means for transmitting, to the second device when the event occurs, at least the counting signal to enable the second device to count the number of devices for determining a type of signals.

In some example embodiments, the event comprises detection of a triggering signal, and the first configuration indicates at least one of starting time, duration or periodicity of a time interval for detecting the triggering signal.

In some example embodiments, the type of signal is related to a unicast, multicast or broadcast service, and the triggering signal is associated with a radio network temporary identifier for identifying the unicast, multicast or broadcast service.

In some example embodiments, the event comprises expiration of a timer associated with one or more beams, and receiving the first configuration comprises: receiving the first configuration on one of the one or more beams.

In some example embodiments, the apparatus further comprises: means for receiving, from the second device, a second configuration associated with the counting signal.

In some example embodiments, the second configuration indicates at least one of one or more random access preambles or a time and frequency resource of a random access channel for transmission of the one or more random access preamble, and the counting signal comprises a random access preamble of the one or more random access preambles.

In some example embodiments, the second configuration indicates a common counting signal, and the apparatus further comprises: means for generating the counting signal by adding at least one of a timing offset or a phase offset to the common counting signal.

In some example embodiments, the second configuration indicates a set of candidate counting signals, and the apparatus further comprises: means for selecting, from the set of candidate counting signals, a candidate counting signal as the counting signal to be transmitted to the second device.

In some example embodiments, the second configuration is associated with one or more beams for the transmission of the counting signal.

In some example embodiments, the means for transmitting at least the counting signal comprises: means for transmitting, to the second device, an indication of a beam for the type of signals when transmitting the counting signal.

In some example embodiments, the at least counting signal indicates a beam for the type of signals.

In some example embodiments, the first device is in an idle mode or an inactive mode.

In some aspects, an apparatus comprises: means for allocating a first configuration associated with an event to trigger transmission of one or more counting signals from one or more further devices; means for sending the first configuration; and means for counting, based on the number of counting signals, the number of devices to determine a type of signals.

In some example embodiments, the event comprises detection of a triggering signal from the second device.

In some example embodiments, the apparatus further comprises: means for sending the triggering signal on a plurality of beams.

In some example embodiments, the first configuration indicates at least one of starting time, duration or periodicity of a time interval for detecting the triggering signal.

In some example embodiments, the type of signal is related to a unicast, multicast or broadcast service, and the triggering signal is associated with a group radio network temporary identifier for identifying the unicast, multicast or broadcast service.

In some example embodiments, the event comprises expiration of a timer associated with one or more beam, and the means for sending the first configuration comprises: means for sending the first configuration on the one or more beams.

In some example embodiments, the apparatus further comprises: means for allocating a second configuration associated with the one or more counting signals; and means for sending the second configuration.

In some example embodiments, the one or more counting signals comprises one or more random access preambles, and the second configuration indicates at least one of the one or more random access preambles or a time and frequency resource of a random access channel for the transmission of the one or more random access preambles.

In some example embodiments, the apparatus further comprises: means for generating the one or more random access preambles from a root sequence.

In some example embodiments, the second configuration is associated with one or more beams for transmission of the one or more counting signals.

In some example embodiments, the second configuration indicates a set of candidate counting signals.

In some example embodiments, the second configuration indicates a common counting signal, and the means for counting the number of devices comprises: means for detecting the common counting signals; and means for counting the number of devices based on the received signal strength of the detected common counting signals.

In some example embodiments, the second configuration is associated with a mobile or stationary state of the one or more further devices.

In some example embodiments, the apparatus further comprises: means for detecting one or more indication of one or more beams for the type of signals.

In some example embodiments, the one or more counting signals indicate one or more beams for the type of signals.

In some example embodiments, the apparatus further comprises: means for selecting, based on the determined number of devices, the type of signals from a unicast signal, a multicast signal and a broadcast signal.

In some example embodiments, the means for sending the first configuration comprises: means for broadcasting or multicasting the first configuration.

In some example embodiments, the one or more further devices are in an idle mode or an inactive mode.

In some aspects, a computer readable storage medium comprises program instructions stored thereon, the instructions, when executed by a processor of a device, causing the device to perform the method according to some example embodiments of the present disclosure.

What is claimed is:

1. A first device, comprising:
at least one processor; and
at least one memory including computer program code;
the at least one memory and the computer program code configured to, with the at least one processor, cause the first device to:
receive, from a second device, a first configuration associated with an event to trigger transmission of a counting signal from the first device to the second device;
determine whether the event occurs; and
transmit, to the second device when the event occurs, at least the counting signal to enable the second device to count the number of devices for determining a type of signals,
wherein first device is caused to transmit, to the second device, an indication of a beam for a further transmission to be sent by the second device to the first device when the first device transmits the counting signal
wherein the event comprises detection of a triggering signal, and the first configuration indicates at least a starting time, a duration, and periodicity of a time interval for detecting the triggering signal,
wherein the type of signal is related to a unicast, multicast or broadcast service, and the triggering signal is associated with a radio network temporary identifier for identifying the unicast, multicast or broadcast service,
wherein the first device is further caused to:
receive, from the second device, a second configuration associated with the counting signal,
wherein the second configuration indicates one or more random access preambles and a time and frequency resource of a random access channel for transmission of the one or more random access preamble, and the counting signal comprises a random access preamble of the one or more random access preambles,
wherein the second configuration further indicates a common counting signal, and the first device is caused to generate the counting signal by adding a timing offset and a phase offset to the common counting signal, wherein the timing offset and the phase offset are implicitly determined, based on a device identifier, by the first device.

2. The first device of claim 1, wherein
the triggering signal is detected by the first device in a predefined time interval, and
the time interval is orthogonal to or separated from a Discontinuous Reception (DRX) procedure for paging.

3. The first device of claim 2, wherein the triggering signal is a group triggering signal associated to a group radio network temporary identifier that is tied to a specific multicast service and a service or feature specific mapping is configured for the triggering signal, wherein the triggering signal is associated with a capability bit or feature group.

4. The first device of claim 1, wherein the event comprises expiration of a timer associated with one or more beams, and the first device is caused to
receive the first configuration on one of the one or more beams.

5. The first device of claim 1, wherein the second configuration indicates a set of candidate counting signals, and the first device is caused to select, from the set of candidate counting signals, a candidate counting signal as the counting signal to be transmitted to the second device,
wherein the selection of a candidate counting signal is performed by the first device according to a predefined rule, the first device uses the following equation to select a preamble to be used:

preamble index=UE_ID mod N where a preamble index represents an index of a preamble, UE_ID represents a UE identification, and N represents the number of preambles in the set of preambles.

6. The first device of claim 1, wherein the second configuration is associated with one or more beams for the transmission of the counting signal.

7. The first device of claim 1, wherein the at least counting signal indicates a preferred beam for the type of signals,
wherein the association between the counting signal and a beam or a synchronization signal block (SSB) is predefined and different configurations of the counting signal are associated with different beams and wherein the preferred beam is explicitly or implicitly indicated by the counting signal.

8. The first device of claim 1, wherein the first device is in an idle mode with information from only a single cell using an angle of arrival plus timing, wherein the type of signals comprises relevant positioning reference signals.

9. A second device, comprising:
at least one processor; and
at least one memory including computer program code;
the at least one memory and the computer program code configured to, with the at least one processor, cause the second device to:
   allocate a first configuration associated with an event to trigger transmission of one or more counting signals from one or more further devices;
   send the first configuration; and
   count, based on the number of counting signals, the number of devices to determine a type of signals, wherein the one or more counting signals indicate one or more beams for a further transmission to be sent by the second device to the one or more further devices,
wherein the event comprises detection of a triggering signal from the second device,
wherein the first configuration indicates a starting time, a duration and a periodicity of a time interval for detecting the triggering signal,
wherein the second device is further caused to determine a type of signal for the further transmission based on the number of devices, the type of signal comprising one or more unicast signals, a multicast signal, and a broadcast signal and the triggering signal is associated with a radio network temporary identifier for identifying the unicast, multicast, and broadcast services,
wherein the second device is further caused to:
   allocate a second configuration associated with the one or more counting signals; and
   send the second configuration,
   wherein the one or more counting signals comprises one or more random access preambles, and the second configuration indicates the one or more random access preambles and a time and frequency resource of a random access channel for the transmission of the one or more random access preambles.

10. The second device of claim 9,
wherein the second device is further configured to:
receive from the first device the one or more counting signals along with an indication of a preferred beam, the association between the counting signals and a beam or a synchronization signal block (SSB) being predefined, wherein different configurations of the counting signals may be associated with different beams, and wherein the preferred beam is explicitly or implicitly indicated by the counting signals,
count the devices per beam.

11. The second device of claim 9, wherein the one or more further devices are in an idle mode positioning service with information from only a single cell using an angle of arrival plus timing, wherein the type of signals comprises relevant positioning reference signals, the second device being further configured to determine whether to transmit the relevant positioning reference signals.

12. A method implemented at a first device, comprising:
receiving, from a second device, a first configuration associated with an event to trigger transmission of a counting signal from the first device to the second device;
determining whether the event occurs; and
transmitting, to the second device when the event occurs, at least the counting signal to enable the second device to count the number of devices for determining a type of signals,
the method further comprising transmitting, to the second device, an indication of a beam for a further transmission to be sent by the second device to the first device when the first device transmits the counting signal,
wherein the event comprises detection of a triggering signal, and the first configuration indicates at least a starting time, a duration, and periodicity of a time interval for detecting the triggering signal,
wherein the type of signal is related to a unicast, multicast or broadcast service, and the triggering signal is associated with a radio network temporary identifier for identifying the unicast, multicast or broadcast service,
the method further comprising receiving, from the second device, a second configuration associated with the counting signal,
wherein the second configuration indicates one or more random access preambles and a time and frequency resource of a random access channel for transmission of the one or more random access preamble, and the counting signal comprises a random access preamble of the one or more random access preambles,
wherein the second configuration further indicates a common counting signal, and the first device is caused to generate the counting signal by adding a timing offset and a phase offset to the common counting signal, wherein the timing offset and the phase offset are implicitly determined, based on a device identifier, by the first device.

13. A method implemented at a second device, comprising:
allocating a first configuration associated with an event to trigger transmission of one or more counting signals from one or more further devices;
sending the first configuration; and
counting, based on the number of counting signals, the number of devices to determine a type of signals, wherein the one or more counting signals indicate one or more beams for a further transmission to be sent by the second device to the one or more further devices,
wherein the event comprises detection of a triggering signal from the second device,
wherein the first configuration indicates a starting time, a duration and a periodicity of a time interval for detecting the triggering signal,
wherein the second device determines a type of signal for the further transmission based on the number of devices, the type of signal comprising one or more unicast signals, a multicast signal, and a broadcast signal and the triggering signal is associated with a radio network temporary identifier for identifying the unicast, multicast, and broadcast services,
wherein the method further comprises:
allocating a second configuration associated with the one or more counting signals; and
sending the second configuration,
wherein the one or more counting signals comprises one or more random access preambles, and the second configuration indicates the one or more random access preambles and a time and frequency resource of a random access channel for the transmission of the one or more random access preambles.

* * * * *